United States Patent
Ruffin

(10) Patent No.: US 7,217,022 B2
(45) Date of Patent: May 15, 2007

(54) OPTIC FIBER LED LIGHT SOURCE

(75) Inventor: Marvin Ruffin, Chicago, IL (US)

(73) Assignee: Opto Technology, Inc., Wheeling, IL (US)

( * ) Notice: Subject to any disclaimer, the term of this patent is extended or adjusted under 35 U.S.C. 154(b) by 125 days.

(21) Appl. No.: 10/930,283

(22) Filed: Aug. 31, 2004

(65) Prior Publication Data

US 2006/0044820 A1   Mar. 2, 2006

(51) Int. Cl.
  *F21V 8/00* (2006.01)
(52) U.S. Cl. .................. 362/554; 362/555; 362/582; 362/581
(58) Field of Classification Search ........... 362/555, 362/554, 582, 96, 267, 101, 562, 581; 385/78, 385/88, 93
  See application file for complete search history.

(56) References Cited

U.S. PATENT DOCUMENTS

| | | | |
|---|---|---|---|
| 3,932,761 A | 1/1976 | Ramsey et al. | |
| 4,824,201 A | 4/1989 | Kazovsky | 380/96.16 |
| 5,099,399 A * | 3/1992 | Miller et al. | 362/580 |
| 5,548,676 A | 8/1996 | Savage, Jr. | 385/92 |
| 5,732,176 A * | 3/1998 | Savage, Jr. | 385/92 |
| 5,782,555 A | 7/1998 | Hochstein | |
| 5,806,955 A | 9/1998 | Parkyn, Jr. et al. | |
| 6,272,269 B1 | 8/2001 | Naum | |
| 6,290,382 B1 | 9/2001 | Bourn et al. | 362/554 |
| 6,328,484 B1 | 12/2001 | Uebbing | |
| 6,398,397 B1 * | 6/2002 | Koren | 362/562 |
| 6,443,594 B1 | 9/2002 | Marshall | |
| 6,473,554 B1 | 10/2002 | Pelka et al. | 385/146 |
| 6,529,318 B1 | 3/2003 | Kaneda et al. | |
| 6,595,674 B1 | 7/2003 | Yoneda | |
| 6,595,675 B2 * | 7/2003 | Dongo | 362/562 |
| 6,611,110 B1 | 8/2003 | Fregoso | |
| 6,639,733 B2 | 10/2003 | Minano et al. | |

(Continued)

OTHER PUBLICATIONS

Product Sheet from Illumination Management Solutions, Inc., for Fiber Magic™ I Compact LED Fiber Engine and Fiber Magic™ III LED Fiber Engine, DMX, Too! no date.

(Continued)

Primary Examiner—Stephen F Husar
Assistant Examiner—Peggy A. Neils

(57) ABSTRACT

An exterior lighting device based on a light emitting diode in conjunction with an optic fiber is disclosed. The device has a cylindrical housing having a closed end and an open end. The light emitting diode is placed on the interior of the on the closed end of the cylindrical housing. A clear lens having one end in proximity with the light emitting diode and an opposite end with a flat surface is provided. A top cap is installed over the open end of the cylindrical housing. The top cap forms a water tight seal with the cylindrical housing using O-rings. A retaining plate is held in place between the top cap and the cylindrical housing. The retaining plate is locked with the flat surface of the lens thus holding the lens in place over the light emitting diode. An optic fiber has a receiving end held by the retaining plate in proximity to the light emitting diode and an opposite emitting end extending from a socket in the top cap. A coupling assembly sits in the socket in the top cap and holds the optic fiber in relation to the top cap.

7 Claims, 6 Drawing Sheets

U.S. PATENT DOCUMENTS

| | | |
|---|---|---|
| 6,679,621 B2 | 1/2004 | West et al. |
| 2002/0126503 A1 | 9/2002 | Reed |
| 2003/0112639 A1 | 6/2003 | Stack |
| 2003/0147254 A1 | 8/2003 | Yoneda et al. |
| 2003/0156431 A1* | 8/2003 | Gozum et al. .............. 362/582 |
| 2003/0198061 A1 | 10/2003 | Chambers et al. |
| 2003/0219207 A1 | 11/2003 | Guy |
| 2003/0235800 A1 | 12/2003 | Qadar |
| 2004/0043351 A1 | 3/2004 | Logan |
| 2004/0051482 A1 | 3/2004 | Fregoso |
| 2004/0057251 A1 | 3/2004 | Isaacson et al. |
| 2004/0170014 A1* | 9/2004 | Pritchard et al. ........... 362/202 |
| 2006/0018125 A1* | 1/2006 | Miller et al. ................ 362/554 |

OTHER PUBLICATIONS

McLaughlin, Robert, Intelligent Algorithms For Finding Curves And Surfaces In Real World Data, 2000, pp. 27-51.

* cited by examiner

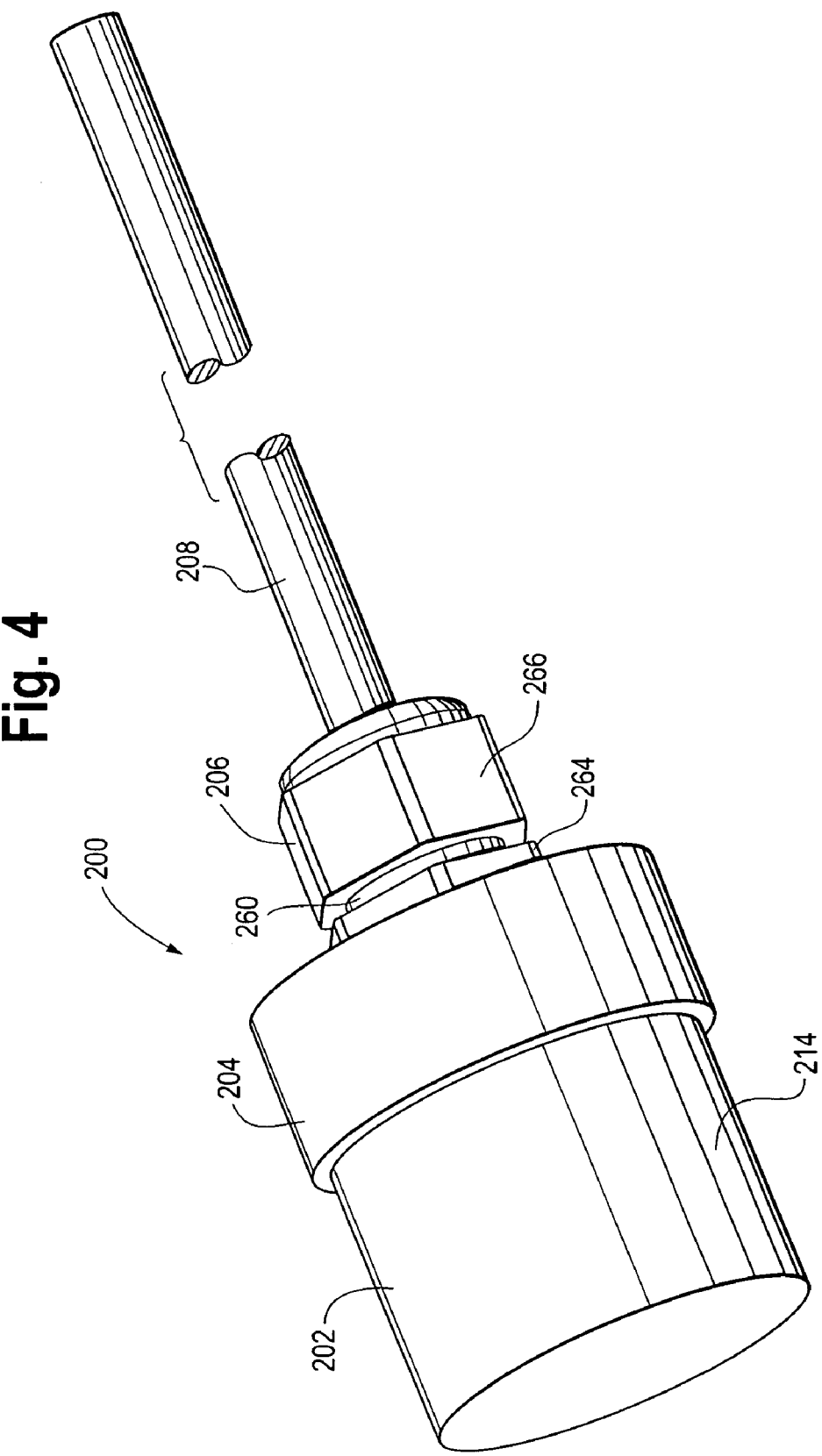

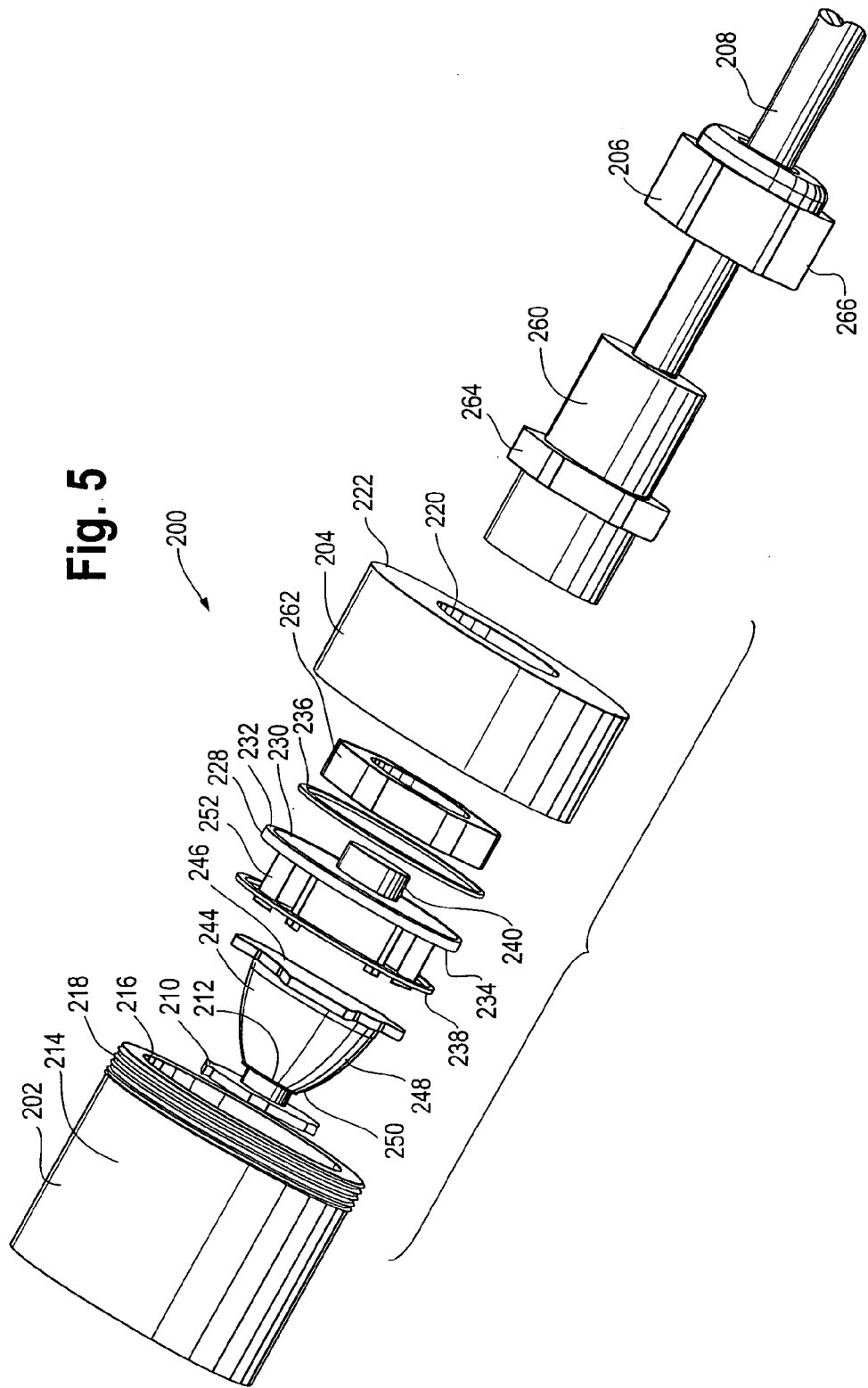

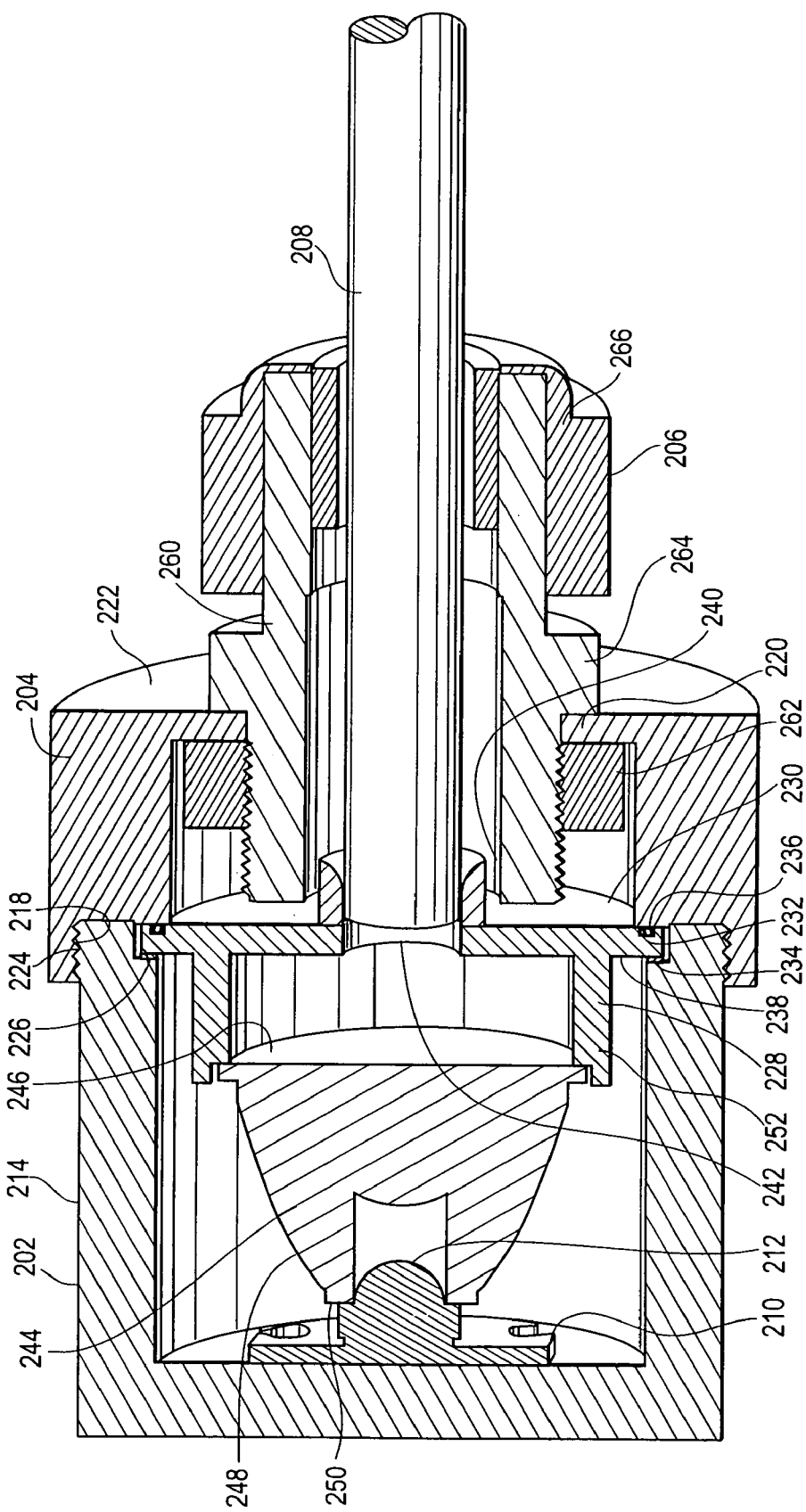

ofOPTIC FIBER LED LIGHT SOURCE

FIELD OF INVENTION

The present invention relates generally to the field of light emitting diode driven optic fiber lighting devices. More specifically, the present invention is directed to a water resistant optic fiber light emitting diode device which may be used in outdoor lighting applications.

BACKGROUND OF INVENTION

Light emitting diodes (LEDs) are well known solid state light sources. LEDs have many advantages over traditional lighting sources such as incandescent bulbs as they are cheaper to produce, more robust, and require less power. LEDs are especially desirable as they emit light with high power efficiency over specific colors in the spectrum. However, LEDs are not a focused light source and suffer from relatively low light output. The lack of focused light and low light output prevents application of LEDs to uses where high light intensity is desired. Further LEDs cannot be fabricated in different shapes for decorative purposes. Finally, the light output of LEDs cannot be intensified without an optical device to focus the light.

There are many commercial applications requiring high light output. For example, there is a great demand for outdoor and indoor decorative or architectural lighting. Neon lighting is presently used for such applications. Neon or fluorescent lighting uses a glass tube which is filled with neon gas which is then electrified. Such devices may be used for lighting but also for advertising and signs as the tubes may be fabricated into different shapes. Such tubes may have different colors or generate simple white light. The light intensity of a neon tube depends on the color generated.

However neon lighting suffers from a number of problems. Neon lights require a relatively large amount of electricity resulting in greater costs for applications requiring long term use such as outdoor signs. Also, neon lights require periodic replacement and maintenance because such lights experience a significant drop off in output after continual use. Further, the maximum length of a neon tube is around seven feet which necessitates more units for large scale uses. All of these factors may create cost issues. Neon lights require a high voltage transformer which may create safety issues. Finally, neon lights must be installed with care in outdoor situations as the electrical components require considerable shielding in order to remain resistant to water.

Thus, there is a need for a light emitting diode based optic fiber lighting source which has high reliability. There is a further need for an LED based lighting system which may be used for outdoor applications and is therefore durable and water resistant. There is also a need for a LED based lighting system which may be used for applications requiring water tight housings such as underwater lighting. There is also a need for a LED based lighting system which may be used for commercial applications for attractive and signage based lighting.

SUMMARY OF THE INVENTION

These needs and others may be met by the present invention, one example of which is a commercial lighting device having a housing having a closed end and an open end. A top cap installable over the open end of the housing is provided. A light emitting diode is contained in the closed end of the housing. An optic fiber coupler having an aperture is fixed to the top cap. An optic fiber is held by the aperture of the coupler and has a light receiving end in proximity to the light emitting diode.

A second example is an exterior lighting device having a cylindrical housing having a closed end and an open end. A light emitting diode is placed on the interior of the on the closed end of the cylindrical housing. A lens having one end in proximity with the light emitting diode and an opposite end with a flat surface is provided. A top cap is installed over the open end of the cylindrical housing, the top cap forming a water tight seal with the cylindrical housing, the top cap having a socket. A retaining plate is held in place between the top cap and the cylindrical housing. The retaining plate is locked with the flat surface of the lens. An optic fiber having a receiving end held by the retaining plate is located in proximity to the light emitting diode and an opposite emitting end extending from the top cap. A coupling assembly which sits in the socket in the top cap holds the optic fiber in relation to the top cap.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

These and further aspects and advantages of the invention will be discussed more in detail hereinafter with reference to the disclosure of preferred embodiments, and in particular with reference to the appended Figures wherein:

FIG. 4 is a perspective view of an alternative light emitting diode based lighting device for external applications according to another example of the present invention;

FIG. 5 is an exploded perspective view of the components of the lighting device in FIG. 4;

FIG. 6 is a cutaway view of the lighting device in FIG. 4.

DESCRIPTION OF THE PREFERRED EMBODIMENT

Figure 1:
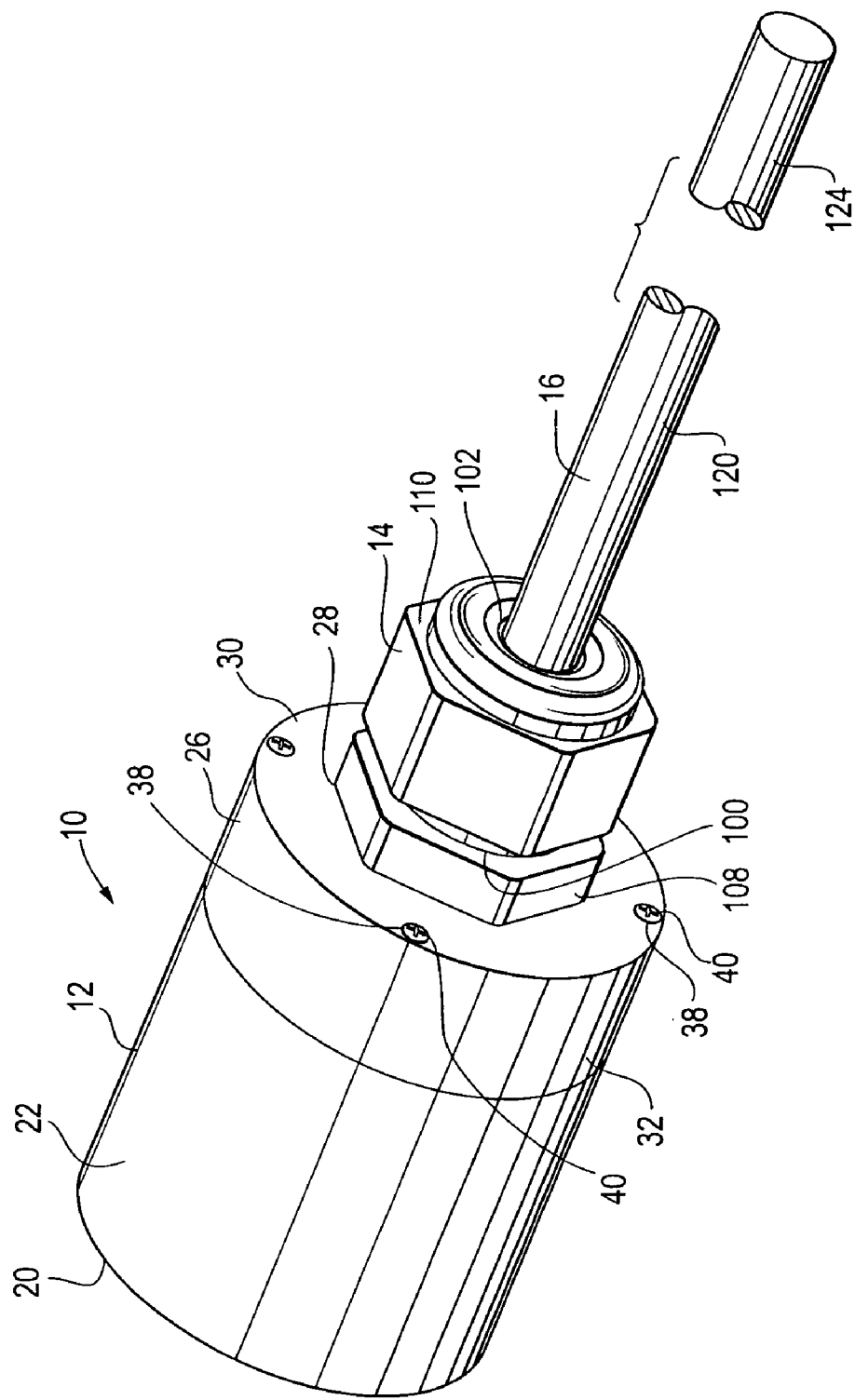
FIG. 1 is a perspective view of a light emitting diode optic fiber based lighting device for external applications according to one example of the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Figure 2:
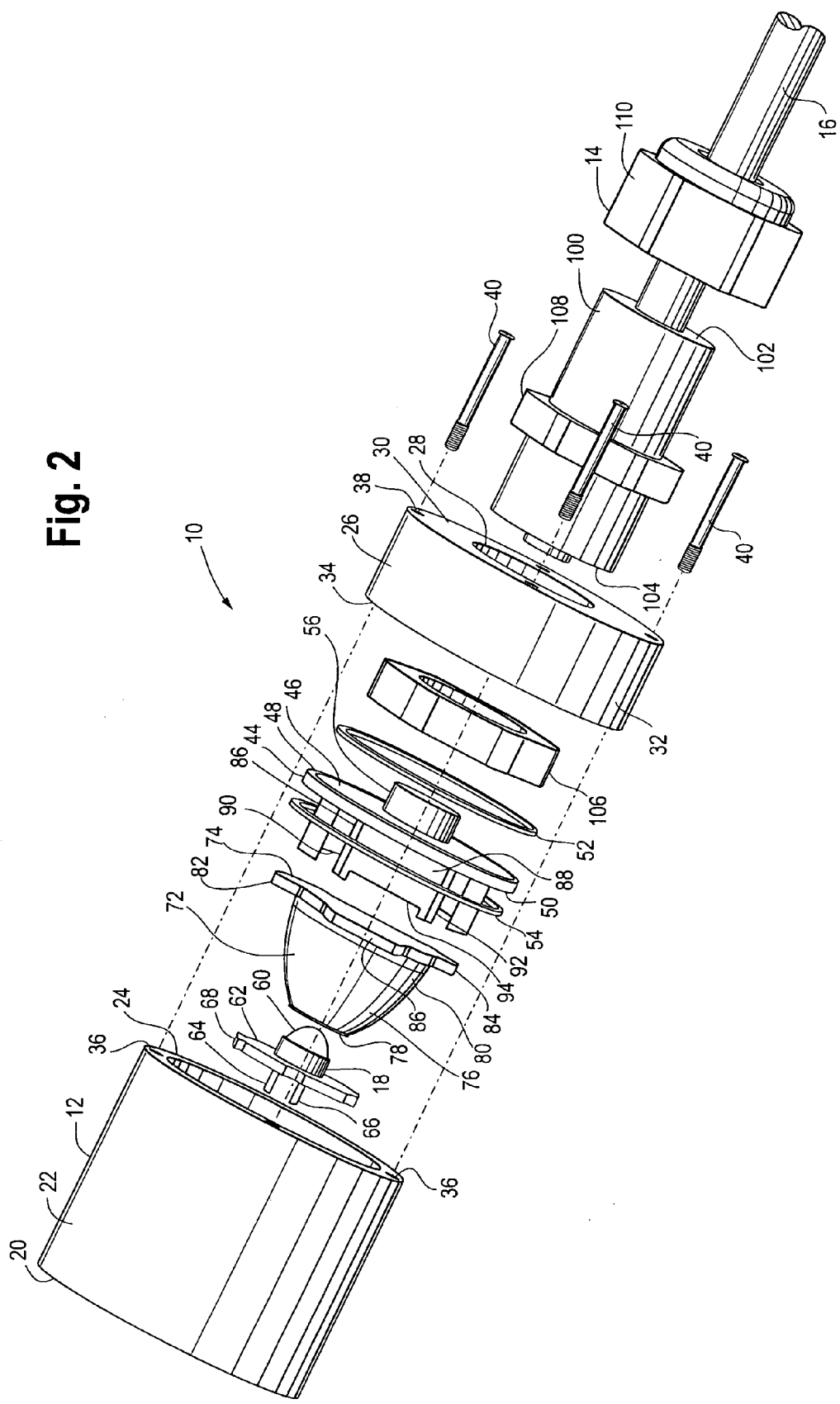
FIG. 2 is an exploded perspective view of the components of the lighting device in FIG. 1.
Figure 3:
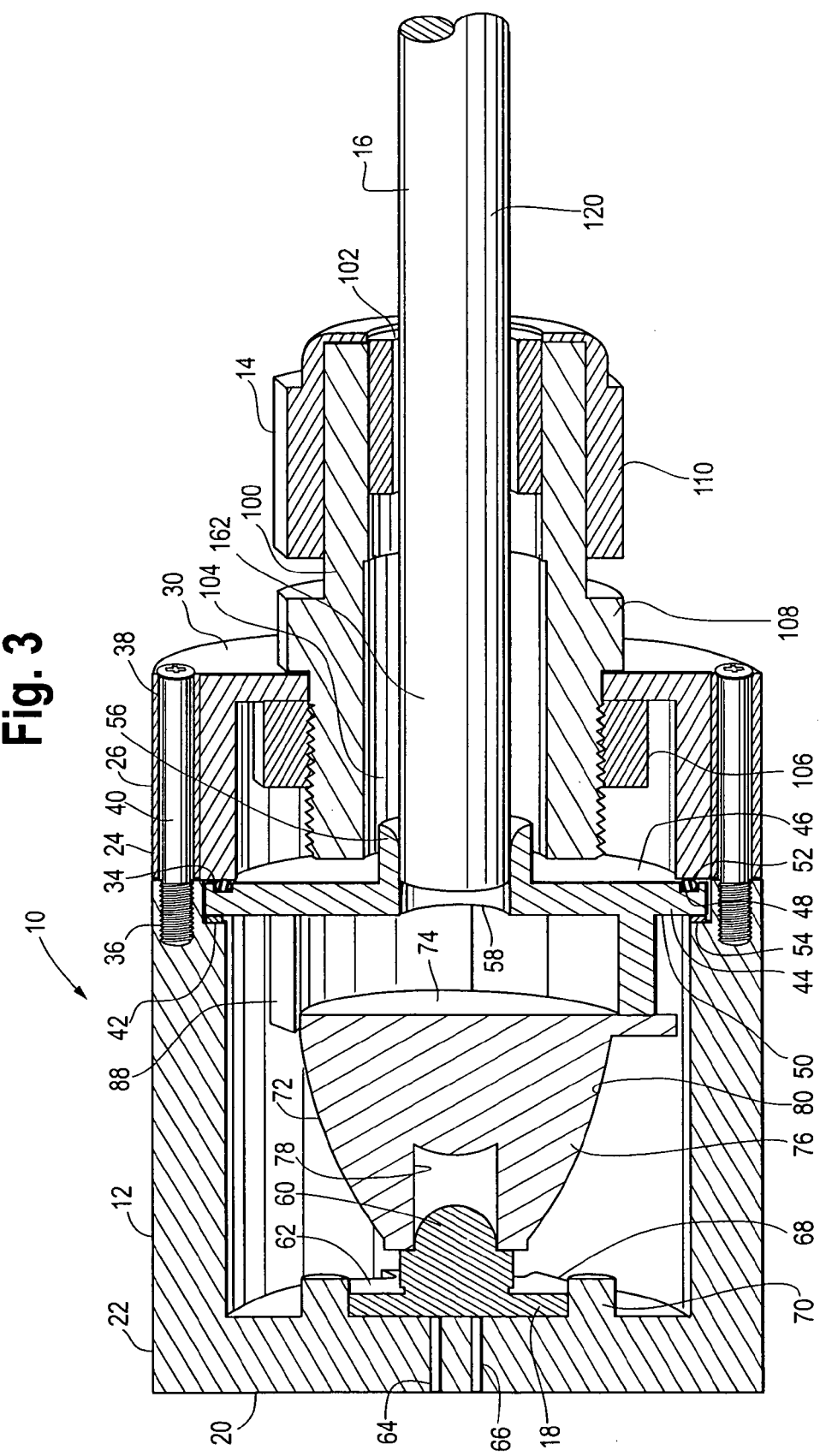
FIG. 3 is a cutaway view of the lighting device in FIG. 1.

FIGS. 1–3 show a lighting device 10 which is one example of the present invention. The lighting device 10 is a high output lighting device which is designed for decorative outdoor lighting applications such as signs or architectural highlights. Of course the lighting device 10 may be used for other lighting applications.

The lighting device 10 has a housing 12, an optic fiber bracket assembly 14 and an optic fiber 16. The housing 12 encloses a lighting assembly 18 which is holds a light emitting diode (LED) as will be explained below. The housing 12 has a closed end with a back plate 20, a circular side wall 22, and an open end with a shoulder 24. A top cap 26 fits over the shoulder 24 to enclose the housing 12. The top cap 26 has a mounting socket 28 which holds the optic fiber bracket assembly 14. The housing 12 is preferably cylindrically shaped and constructed from a durable material preferably metal or thermally conductive high strength plastic in order to be weather or water resistant or in the case of this example water tight. Of course other shapes may be used for the housing depending on the application required.

The top cap 26 has a front surface 30, a circular side wall 32 and a shoulder surface 34. The shoulder 24 of the housing 12 is in contact with the shoulder surface 34 of the top cap 26. The shoulder surface 34 of the top cap 26 is wider than the shoulder surface 24 of the housing 12. The shoulder 24 has a series of threaded mounting holes 36. The front surface 30 has a series of threaded mounting holes 38 which correspond to the threaded mounting holes 36 on the shoulder 24. A series of bolts 40 are screwed into the threaded mounting holes 36 and 38 in order to join the top cap 26 with the shoulder 24.

An inner notch 42 is formed on the shoulder 24 of the housing 12. A retaining plate 44 is inserted on the inner notch 42 and held in place by the shoulder surface 34 of the top cap 26. The retaining plate 44 has a top surface 46 which has a circular groove 48 and a bottom surface 50. An O-ring 52 is placed in the circular groove 48 to create a seal between the top surface 46 of the retaining plate 44 and the shoulder surface 34 of the top cap 26. The bottom surface 50 of the retaining plate 44 is placed on an O-ring 54 to create another seal between the bottom surface 50 and the notch 42. The housing 12 is thus water proof allowing the device 10 to be used for underwater applications such as pool lighting. It is to be understood for many outdoor applications, the housing 12 need only be water resistant in which case the O-rings 52 and 54 and sealing arrangements may not be needed. The top surface 46 has a socket 56 which holds one end of the optic fiber 16. The top surface 46 has a circular window 58 which allows light transmission to the optic fiber 16. Alternatively, the entire retaining plate 44 may be fabricated from clear plastic.

The lighting assembly 18 includes an LED 60 which is any semi-conductor, solid state light source such as a flat LED. The LED 60 will preferably have a lambertian distribution for the widest angle distribution of light. The LED 60 is mounted on a substrate plate 62 which may be coupled to a power source via two electrical pins 64 and 66. In addition to the LED 60, the housing 12 may contain a power supply for powering the LED 60. Such a power supply is enclosed in housing 12 and sealed with a water tight fitting. This power supply could be of various types with the final stage being a constant current stage for driving the LED 60. The stages before the constant current supply could include an AC/DC converter or a DC/DC converter. Such power supplies are connected to an external low voltage transformer which can be located remotely to convert 120VAC to low voltage to reduce installation cost. Of course the entire power supply may be located external to the housing 12 if desired.

The substrate plate 62 has a series of edge notches 68. A series of pins 70 extend from the back plate 20 of the housing 12. The pins 70 lock in the notches 68 and hold the LED 60 and the substrate 62 in place. Heat from the LED 60 may be thermally dissipated through the substrate 62 to the housing 12.

A reflector 72 is installed over the LED 60 to focus the light emitted from the LED 60. The reflector 72 is fabricated from a clear material such as PMMA/plexiglass, glass or plastic. The reflector 72 has a front flat circular surface 74 which is mounted on a conical body 76. The reflector 72 has a rear end 78 which creates a socket fitting over the LED 60. Other types of materials and shapes such as a metallic cone may be used for the reflector 72. The conical body 76 is shaped to reflect light rays from the LED 60 out through the front surface 74. A reflective surface 80 on the border of the conical body 76 reflects incident light from the LED 60, through the front surface 74 to the fiber optic 16. The basic shape of the conical body 76 is an ellipse according to the equation of $x^2/A+y^2/B=1$. The ellipse shape has two foci which enables light collection. The reflector 76 may also be a compound elliptical concentrator that also has two foci.

Three arms 82, 84 and 86 extend from the front surface 74 for fitting the reflector 72 in relation to the top cap 26 and the retaining plate 44. The bottom surface 50 of the retaining plate 44 has a collar 88 which forms three slots 90, 92 and 94. The arms 82, 84 and 86 are inserted in the slots 90, 92 and 94 in order to hold the reflector 72 in place in relation to the retaining plate 44.

The mounting bracket assembly 14 has a guiding sleeve 100 which is placed around the optic fiber 16 and through the mounting socket 28 of the top cap 26. The guiding sleeve 100 is preferably a flexible material such as plastic and has a first open end 102 and a second open end 104 which is inserted around the socket 56 on the retaining plate 44. The exterior of the guiding sleeve 100 is threaded to allow the placement of the other components of the mounting bracket assembly 14. An inner collar 106 is rotated on the sleeve 100 to be positioned under the top cap 26. The top cap 26 is then placed in position to rest on the inner collar 106 and the shoulder 24 of the housing 12. An outer collar 108 is then rotated in place on the sleeve 100 to rest on the front surface 30 of the top cap 26. The inner and outer collars 106 and 108 thus hold the sleeve 100 in place relative to the top cap 26. A locking screw 110 is then threaded over the open end 102 of the sleeve 100 to lock the fiber optic 16 in place. The locking screw 110 has a slight taper at one end. When the locking screw 110 is screwed on the guide sleeve 100, the guiding sleeve 100 flexes and compresses the open end 102 to create a water tight seal along the interface with the optic fiber 16.

The optic fiber 16 is shown in FIGS. 1–3 as a linear rod shape. However, the optic fiber 16 may be formed or twisted in any variety of non-linear shapes. For example, the optic fiber 16 may be bent into the shape of a letter for a commercial application. In this example, the optic fiber 16 is manufactured by 3M, although other optic fibers which allow for side or end light effects may be used. The optic fiber 16 is preferably plastic to be flexible and resistant to fatigue, elongation and vibration. The optic fiber 16 has a core material which is preferably polymethacrylate and a cladding material which has a lower refractive index than the core material. When light enters the optic fiber 16, it is transported down the length of the fiber by total internal reflection between the core and cladding layers.

The optic fiber 16 has a body 120 and a light receiving end 122 which is in proximity to the LED 60 and receives the light from the LED 60. The optic fiber 16 also has an emitting end 124. The optic fiber 16 allows end light emission from the emitting end 124 or preferably a side light effect from the perimeter of the body 120. In this case, the cladding material of the optic fiber 16 is translucent.

Light from the LED 60 is focused on the receiving end 122 of the optic fiber 16 via position of the LED 60 and any incident light is directed by the reflector 72 through the window 58 to the receiving end 122. When the light from the LED 60 is focused on receiving end 122, it is scattered at the core/cladding interface and leaves the body 120 along the perimeter of the optic fiber 16. The light emission appears visually uniform along the length of the optic fiber 16. Since the light is directed by the optic fiber 16, any shape may be formed by the body 120 and corresponding light will be emitted throughout the body 120. The optic fiber 16 in this example is a core rod, however, a bundle of smaller diameter fibers may be bundled and used in place of the optic fiber 16. In addition, the color of the LED 60 may be changed or the cladding of the optic fiber 16 may have different colors for further decorative effect.

FIGS. 4–6 show a second lighting device 200 which is another example of the present invention. The lighting device 200 is a high output lighting device which is designed for decorative indoor or outdoor lighting applications. As will be explained below the lighting device 200 is water tight using interlocking components, making device 200 easier to assemble than the bolts 40 needed for the lighting device 100 described in FIGS. 1–3.

The lighting device 200 has a housing 202, a top cap 204, an optic fiber bracket assembly 206 and an optic fiber 208. The housing 202 has a closed end which encloses a base substrate 210 which holds a light emitting diode (LED) 212. The housing 202 has an outer surface 214 and an open end 216. The outer surface 214 has a threaded area 218 which is near the open end 216. The cap 204 has a mounting socket 220 which holds the optic fiber bracket assembly 206. The housing 202 is constructed from a durable material preferably metal or thermally conductive high strength plastic in order to be weather or water resistant or in the case of this example water tight.

The top cap 204 has a front surface 222 and an interior threaded surface 224 which allows the top cap 204 to be screwed on the housing 202. An inner notch 226 is formed on the interior of the open end 216 of the housing 202. A retaining plate 228 is inserted on the inner notch 226 and held in place by the top cap 204. The retaining plate 228 has a top surface 230 which has a circular groove 232 and a bottom surface 234. An O-ring 236 is placed in the circular groove 232 to create a seal between the top surface 230 of the retaining plate 228 and the top cap 204. The bottom surface 234 of the retaining plate 228 is placed on an O-ring 238 to create another seal between the bottom surface 234 and the notch 226. The housing 202 is thus water proof allowing the lighting device 200 to be used for underwater applications such as pool lighting. For other applications, the housing 202 and cap 204 may be simply water resistant without the O-ring arrangements described above.

The top surface 230 has a socket 240 which holds one end of the optic fiber 208. The top surface 230 has a circular window 242 which allows light transmission to the optic fiber 208. A reflector 244 is installed over the LED 212 to focus the light emitted from the LED 212. The reflector 244 is fabricated from a clear material and has a front flat circular surface 246 which is mounted on a conical body 248. The reflector 244 has a rear end 250 which creates a socket fitting over the LED 210. The conical body 248 is shaped to reflect light rays from the LED 212 out through the front surface 246.

A series of arms extend from the front surface 246 for fixing the reflector 244 in relation to the top cap 204 and the retaining plate 228. The bottom surface 234 of the retaining plate 228 has a collar 252 which forms slots which interlock with the arms of the front surface 246.

The mounting bracket assembly 206 has a guiding sleeve 260 which is placed around the fiber optic 208 and through the mounting socket 220 of the top cap 204. The guiding sleeve 260 has one end which is inserted around the socket 240 on the retaining plate 228. The exterior of the guiding sleeve 260 is threaded allowing an inner collar 262 to be rotated into place on the guiding sleeve 260 on the interior of the top cap 204. An outer collar 264 is rotated in place on the guiding sleeve 260 to rest flush on the front surface 222 of the top cap 204. The inner and outer collars 262 and 264 thus hold the guiding sleeve 260 in place relative to the top cap 204. A locking screw 266 is threaded over the open end of the sleeve 260 to lock the fiber optic 208 in place.

The optic fiber 208 is similar to the optic fiber 16 shown in FIGS. 1–3. The optic fiber 208 receives the light from the LED 212 and allows light emission from the perimeter of the optic fiber 208. Light from the LED 212 is focused on the optic fiber 208 via the position of the LED 212. Incident light is directed by the reflector 244 through the window 242 to optic fiber 208.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. An exterior lighting device comprising:
   a cylindrical housing having a closed end and an open end;
   a light emitting diode placed on the interior of the on the closed end of the cylindrical housing;
   a lens having one end in proximity with the light emitting diode and an opposite end with a flat surface;
   a top cap installed over the open end of the cylindrical housing, the top cap forming a water tight seal with the cylindrical housing, the top cap having a socket;
   a retaining plate held in place between the top cap and the cylindrical housing, the retaining plate being locked with the flat surface of the lens;
   a optic fiber having a receiving end held by the retaining plate in proximity to the light emitting diode and an opposite emitting end extending from the top cap; and
   a coupling assembly which sits in the socket in the top cap and holds the optic fiber in relation to the top cap.

2. The lighting device of claim 1 wherein the cylindrical housing has exterior threading, and the top cap has interior threads which mesh with the exterior threading of the cylindrical housing.

3. The lighting device of claim 1 wherein the cylindrical housing has a shoulder on the open end, and the top cap has a surface which overlaps the shoulder, and wherein the top cap is attached to the cylindrical housing using bolts.

4. The lighting device of claim 1 further comprising:
   a first O-ring compressed between the retaining plate and a notch formed on the open end of the cylindrical housing; and
   a second O-ring compressed between the top cap and the retaining plate.

5. The lighting device of claim 1 wherein the optic fiber includes a cladding and a core, the cladding having a lower refractive index then the core.

6. The lighting device of claim 5 wherein the optic fiber is fabricated from polymethacrylate.

7. The lighting device of claim 1 wherein the coupler assembly includes:
   a guiding sleeve which is inserted through the aperture in the top cap;
   an inner retaining collar mounted on the guide sleeve on the interior of the top cap;
   an outer retaining collar mounted on the guide sleeve on the exterior of the top cap; and
   a locking screw holding the optic fiber and mounted on the guide sleeve.

\* \* \* \* \*